United States Patent
Jeng

(10) Patent No.: US 9,007,539 B2
(45) Date of Patent: Apr. 14, 2015

(54) 2D/3D SWITCHABLE IMAGING APPARATUS COMPRISING AN ELECTRONIC LIGHT MUDULATOR AND A CHARGE-CONTROLLING AGENT DISPOSED ON A SURFACE OF LIQUID-CRYSTAL MONOMERS

(71) Applicant: Yue-Shih Jeng, Chu-Nan (TW)

(72) Inventor: Yue-Shih Jeng, Chu-Nan (TW)

(73) Assignee: Innolux Corporation (TW)

( * ) Notice: Subject to any disclaimer, the term of this patent is extended or adjusted under 35 U.S.C. 154(b) by 234 days.

(21) Appl. No.: 13/770,497

(22) Filed: Feb. 19, 2013

(65) Prior Publication Data
US 2013/0215342 A1   Aug. 22, 2013

(30) Foreign Application Priority Data
Feb. 21, 2012   (TW) .............................. 101105588 A

(51) Int. Cl.
G02F 1/1335   (2006.01)
G02F 1/13   (2006.01)
G02B 27/22   (2006.01)

(52) U.S. Cl.
CPC .......... *G02F 1/1323* (2013.01); *G02B 27/2214* (2013.01)

(58) Field of Classification Search
USPC ..................................... 349/15; 359/462–477
See application file for complete search history.

(56) References Cited

U.S. PATENT DOCUMENTS

2012/0019752 A1* 1/2012 He et al. ........................ 349/117

FOREIGN PATENT DOCUMENTS

TW   588169   5/2004
TW   200903081   1/2009

OTHER PUBLICATIONS

Office Action dated Dec. 24, 2013 from corresponding application No. TW 101105588.

* cited by examiner

*Primary Examiner* — Paul Lee
(74) *Attorney, Agent, or Firm* — Lowe Hauptman & Ham, LLP

(57) ABSTRACT

A 2D/3D switchable imaging apparatus is provided, which includes: an imaging unit including an alternate arrangement of a plurality of left-eye pixels and a plurality of right-eye pixels; and an electronic light modulator disposed on the imaging unit, including; a lens structural layer having a plurality of lenticular lens structures and being interposed between a first electrode layer and a second electrode layer, with each of the lens structures including a plurality of liquid-crystal monomers filled therein, and the liquid-crystal monomers having a first imaging mode and a second imaging mode which are switched by an electric field; and a charge-controlling agent on a surface of the liquid-crystal monomers such that the influence of the liquid-crystal monomers with respect to the electric field is enhanced.

20 Claims, 4 Drawing Sheets

2D/3D SWITCHABLE IMAGING APPARATUS COMPRISING AN ELECTRONIC LIGHT MUDULATOR AND A CHARGE-CONTROLLING AGENT DISPOSED ON A SURFACE OF LIQUID-CRYSTAL MONOMERS

This Application claims priority of Taiwan Patent Application No. 101105588, filed on Feb. 21, 2012, the entirety of which is incorporated by reference herein.

BACKGROUND OF THE INVENTION

1. Field of the Invention

The present invention relates to a 3D imaging apparatus. More particularly, the present invention relates to a 2D/3D switchable imaging apparatus.

2. Description of the Related Art

In recent years, 3D imaging apparatus technologies may be mainly classified into two categories: glasses 3D imaging, and naked-eye 3D imaging technologies. The glasses 3D imaging technology utilizes glasses to polarize light so as to make the user's left eye and right eye see the image corresponding to the left eye and the image corresponding to the right eye, respectively. The naked-eye 3D imaging technology utilizes a light modulator directly disposed on the display device to control or change the refraction angle of light so as to make the user's left eye and right eye see the image corresponding to the left eye and the image corresponding to the right eye, respectively. The light modulator is usually a barrier layer or a lenticular structure, such as a lenticular lens. Since the naked-eye 3D imaging technology needs no glasses, it is a relatively easier way to show the 3D image.

In many applications, the 3D imaging apparatus is required to be able to switch between a 2D imaging mode and a 3D imaging mode. For example, the user is more likely to experience fatigue after viewing the 3D imaging mode for awhile, and switching to the 2D imaging mode can make the user feel more relaxed. Alternatively, the 2D imaging mode is better than the imaging 3D mode when better resolution is needed. Thus, a 2D/3D switchable imaging apparatus is developed, in particular, switched using an electric field.

A lenticular lens structural 3D imaging apparatus is one of various kinds of 3D imaging apparatuses. The lenticular lens structural 3D imaging apparatus comprises a lens structural layer interposed between two electrode layers. Each of the lenticular lens structure comprises liquid-crystal monomers filled therein. The liquid-crystal monomers are arranged along a direction not refracting light when no electric field is applied, so that each eye of the user can see the images of all the pixels. In addition, the liquid-crystal monomers will be arranged to a direction refracting the light when an electric field is applied, so that the user's left eye and right eye, respectively, can only see the image of the left-eye pixels and the image of right-eye pixels. Thus the 3D image is shown.

For the lenticular lens structural 3D imaging apparatus, although the 2D/3D modes can be switched by a variation of the applied electric field, increases in sizes and resolution are associated with increasing numbers of the lens structure and a larger cell gap of the lens structural layer. As such, more power consumption will be incurred since a higher electric filed is needed to drive the liquid-crystal monomers, and the rate of liquid-crystal monomers in responding to the electric field may get slower, even slow enough to be observed by the user. In addition, in the 2D image mode, the liquid-crystal monomers in the lens structural layer are easily dispersed by forcing, which is called to push mura problems, resulting in instability of the lenticular lens structural 3D imaging apparatus.

Therefore, a 2D/3D switchable imaging apparatus capable of addressing the above issues is needed.

BRIEF SUMMARY OF THE INVENTION

One object of the present disclosure is to provide a 2D/3D switchable imaging apparatus, including: an imaging unit including an alternate arrangement of a plurality of left-eye pixels and a plurality of right-eye pixels; and an electronic light modulator, including; a lens structural layer having a plurality of lenticular lens structures and being interposed between a first electrode layer and a second electrode layer, wherein each of the lens structures includes a plurality of liquid-crystal monomers filled therein. The liquid-crystal monomers have a first imaging mode and a second imaging mode which are switched by an electric field. A charge-controlling agent on a surface of the liquid-crystal monomers such that the influence of the liquid-crystal monomers with respect to the electric field is enhanced.

BRIEF DESCRIPTION OF THE DRAWINGS

The disclosure will now be described, by way of example, with reference to the accompanying drawings, in which.

DETAILED DESCRIPTION OF THE INVENTION

Figure 1A:
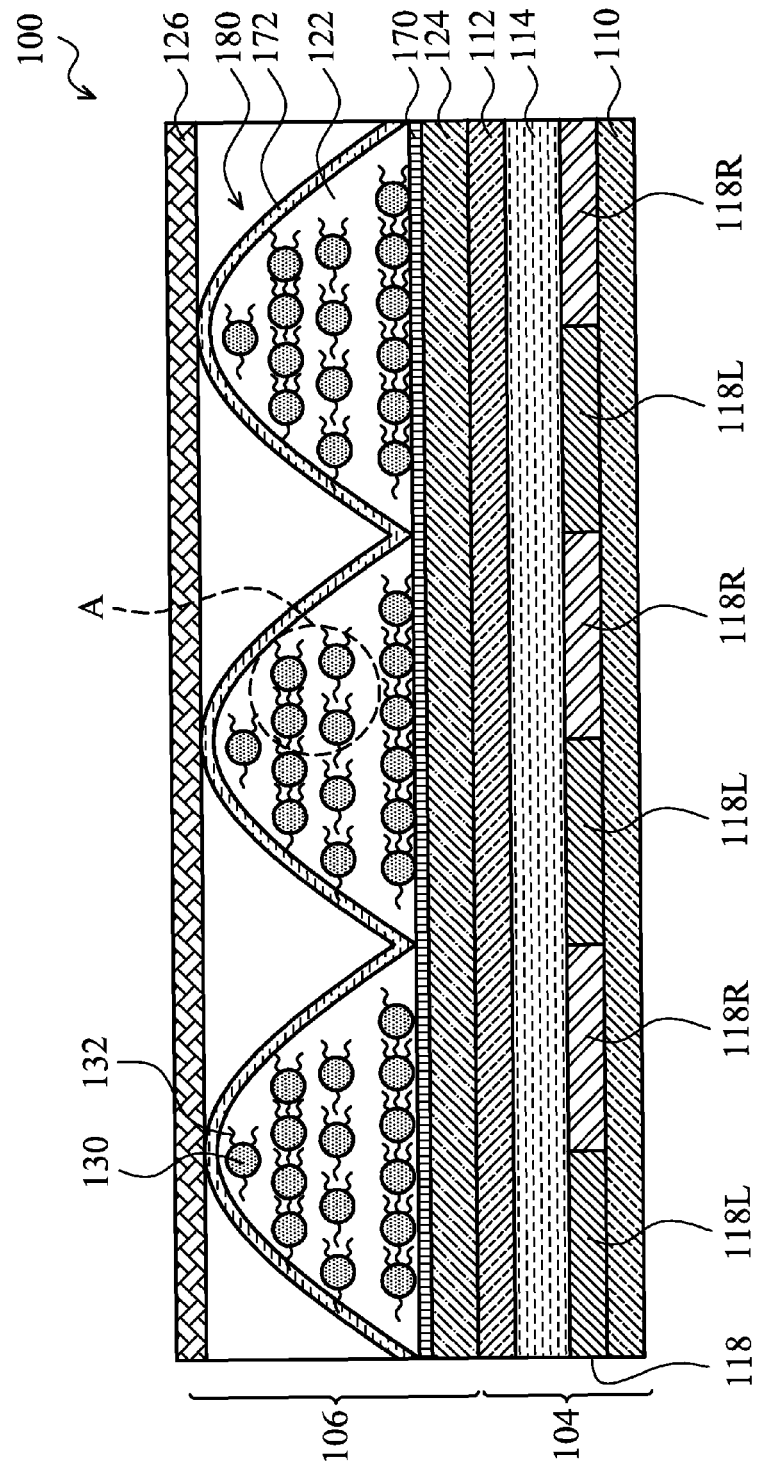
FIG. 1A shows an exemplary scheme of a first imaging mode of a 2D/3D switchable imaging apparatus according to an embodiment of the present disclosure.

FIG. 1A shows an exemplary scheme of a 2D/3D switchable imaging apparatus 100 according to an embodiment of the present disclosure. The 2D/3D switchable imaging apparatus 100 may be, for example, a lenticular lens structural 3D imaging apparatus. The 2D/3D switchable imaging apparatus may comprise an imaging unit 104 and an electronic light modulator 106. The imaging unit 104 may be a liquid-crystal display (LCD) apparatus, a light-emitting diode (LED) imaging apparatus, or an organic light-emitting diode (OLED) imaging apparatus. The following embodiments illustrate only the LCD apparatus, however, it can be understood that one skilled in the art may substitute the LCD apparatus with other imaging devices by using ordinary skill in the art. The imaging unit 104 may comprise an array substrate 110, a color filter substrate 112, and a liquid-crystal layer 114 interposed therebetween. A pixel layer 118 formed of alternate arrangements of a plurality of left-eye pixels 118L and a plurality of right-eye pixels 118R may be disposed on the array substrate 110.

The electronic light modulator 106 may be disposed on the color filter substrate 112 of the imaging unit 104. The electronic light modulator 106 may comprise a first electrode 124, a second electrode 126 and a lens structural layer 122 interposed therebetween. The first electrode layer 124 and second electrode layer 126 may be parallel to each other. The first electrode layer 124 and the second electrode layer 126 may be a transparent conducting layer, such as comprising indium tin oxide (ITO), indium zinc oxide (IZO), indium tin zinc oxide (ITZO), or combinations thereof. The lens structural layer 122 may be disposed on the first electrode layer 124. The lens structural layer 122 may comprise a plurality of lenticular lens structures. Each of the lenticular lens structures may be an enclosed space which has liquid-crystal monomers 130 filled therein, so that the lens structural layer 122 may perform the function of a lenticular lens. Each of the lenticular lens structures may correspond to one of the left-eye pixels 118L and one of the right-eye pixels 118R of the imaging unit 104. In an embodiment, the lenticular lens structures may have an arc upper surface.

A first alignment layer 170 may be interposed between the lens structural layer 122 and the first electrode layer 124. A second alignment layer 172 may be conformally coated on the arc upper surface of the lens structural layer 122. When there is no electric field formed between the first and the second electrodes 124 and 126, the first and the second alignment layers 170 and 172 may align the liquid-crystal monomers 130 and hold their positions. For example, a long axis of liquid-crystal monomers 130 is aligned along a horizontal direction by the first and the second alignment layers 170 and 172. A spacing layer 180 may be filled into the interspaces between the lens structural layer 122 and the second electrode 126. The spacing layer 180 may comprise any suitable transparent fillers.

The liquid-crystal monomers 130 may comprise twisted nematic liquid crystal materials. These liquid-crystal monomers 130 themselves do not have a function group having charges or be easily influenced by charges. A charge-controlling agent 132 may be carried on the surface of the liquid-crystal monomers 130 such that the influence of the liquid-crystal monomers 130 with respect to the electric field is enhanced. For example, by carrying the charge-controlling agent 132, a magnitude of the electric field to drive the liquid-crystal monomers 130 switching between the 2D and 3D imaging modes may be reduced and/or the rate of the liquid-crystal monomers 130 in responding to the electric field may be increased. In an embodiment, the charge-controlling agent 132 may comprise a positive charge-controlling agent selected from the group consisting of quaternary ammonium salts, pyridine salts, onium salts, metal salts, nigrosine dye, polyamine resin, triphenylmethane, imidazole derivatives, amine derivatives, and phosphonium salts. In another embodiment, the charge-controlling agent 132 may comprise a negative charge-controlling agent selected from the group consisting of metal complexes of salicylic acid, alkyl-salicylic acid, azo dye, calixarene compounds, benzyl acid boron complexes, sulfonate salts, and fluorocarbon derivatives. Alternatively, the charge-controlling agent 132 may comprise ionic surfactant selected from the group consisting of aerosol-OT, sodium dodecylbenzenesulfonate, metal salts, polybutene succinimide, maleic anhydride copolymers, vinylpyridine copolymers, maleic anhydride copolymers, acrylic acid copolymers and N,N-dimethylaminoethyl acrylate copolymers. Note that two or more kinds of the charge-controlling agents 132 may be carried on the surface of the liquid-crystal monomers 130. For example, the positive charge-controlling agent and the negative charge-controlling agent may be concurrently adsorbed on the surface of the liquid-crystal monomers 130.

The charge-controlling agent 132 may be carried on the surface of the liquid-crystal monomers 130 by physical adsorption. For example, in an embodiment, the adsorption step may comprise adding the liquid-crystal monomers 130 to a solution containing the charge-controlling agent 132 for adsorbing the charge-controlling agents 132; and washing the liquid-crystal monomers 130 by using a suitable solvent until removing the excessive charge-controlling agent 132, such that only the charge-controlling agent 132 that is resistant to falling off from the surface of the liquid-crystal monomers 130 is remaining.

The 2D/3D switchable imaging apparatus may have a first imaging mode and a second imaging mode. FIG. 1A shows the exemplary scheme of the first imaging mode of the 2D/3D switchable imaging apparatus 100. When in the first imaging mode, the first electrode 124 and the second electrode 126 of the electronic light modulator 106 may have the same electric potential (such as 0) while no electric field is applied to the liquid-crystal monomers 130. At this time, the liquid-crystal monomers 130 are mainly aligned by the first and the second alignment layers 170 and 172, and their long axis along a horizontal direction for avoiding refracting the light emitted from the pixel layer 118 of the imaging unit 104. That is, in the first mode, the liquid-crystal monomers 130 may not refract the light and interfere the optical properties of the lenticular lens structures. Each of the user's eyes may see the images of all the pixels (including the left-eye pixels and the right-eye pixels) of the imaging unit 106, and the 2D image is viewed. That is, when there is no electric field formed between the first and the second electrodes 124 and 126, the 2D/3D switchable imaging apparatus is switched to the 2D imaging mode.

Figure 2A:
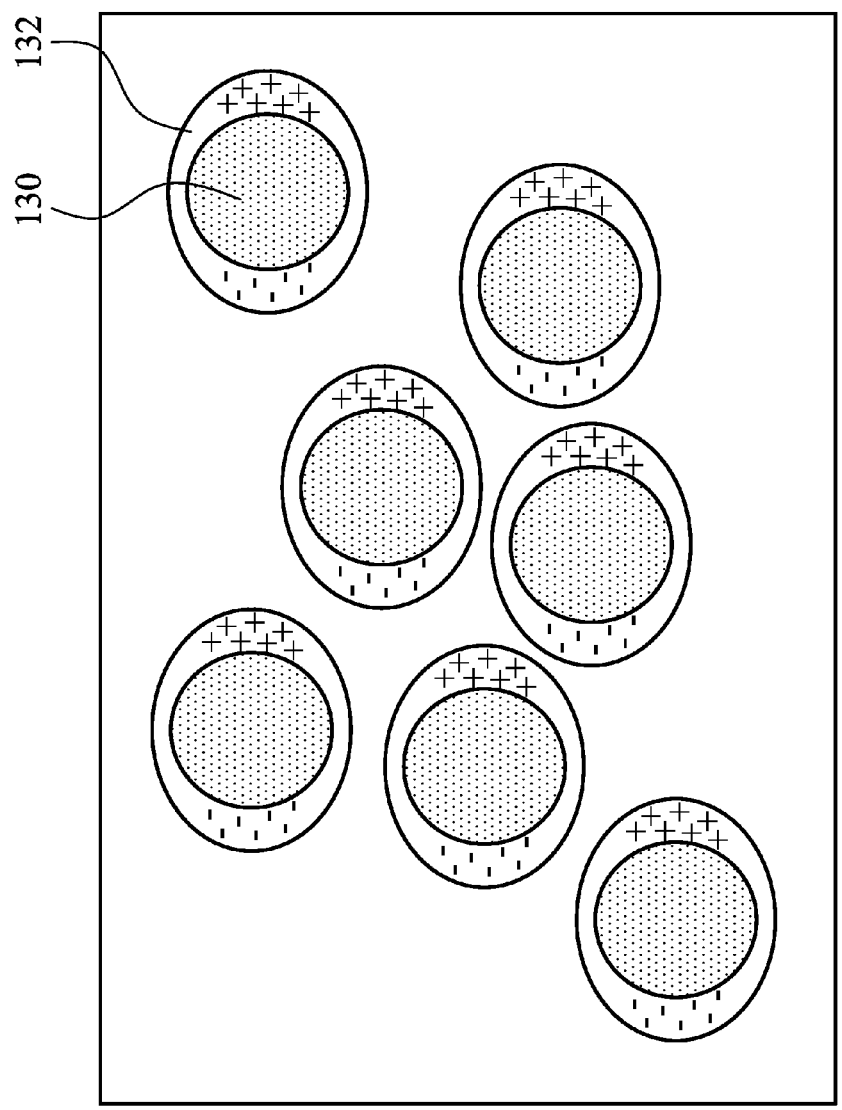
FIG. 2A shows an enlarged exemplary scheme of the area A shown in FIG. 1A.

FIG. 2A shows an enlarged exemplary scheme of the area A shown in FIG. 1A. Referring to FIG. 2A, when there is no electric field, the surface of the liquid-crystal monomers 130 may be partially polarized by the charges of the charge-controlling agent 132, and partial positive and partial negative charges may be produced. For example, the partial positive and partial negative charges produced by the charge-controlling agent 132 are substantially arranged along a direction parallel to the first and the second electrodes 124 and 126 (i.e., the horizontal direction in FIG. 2A), however, the total charges of the liquid-crystal monomers 130 and the charge-controlling agent 132 are maintained in neutral. Thus, the liquid-crystal monomers 130 may attract each other by means of coulomb attraction between the partial positive and partial negative charges, and a more stable status may be maintained. That is, when in the first imaging mode of the 2D/3D imaging apparatus 100 according to the present disclosure, the liquid-crystal monomers 130 carrying charge-controlling agent 130 on their surface may be more resistant to an outer force, and the push mura problems of the conventional imaging apparatus can be therefore addressed.

Figure 1B:
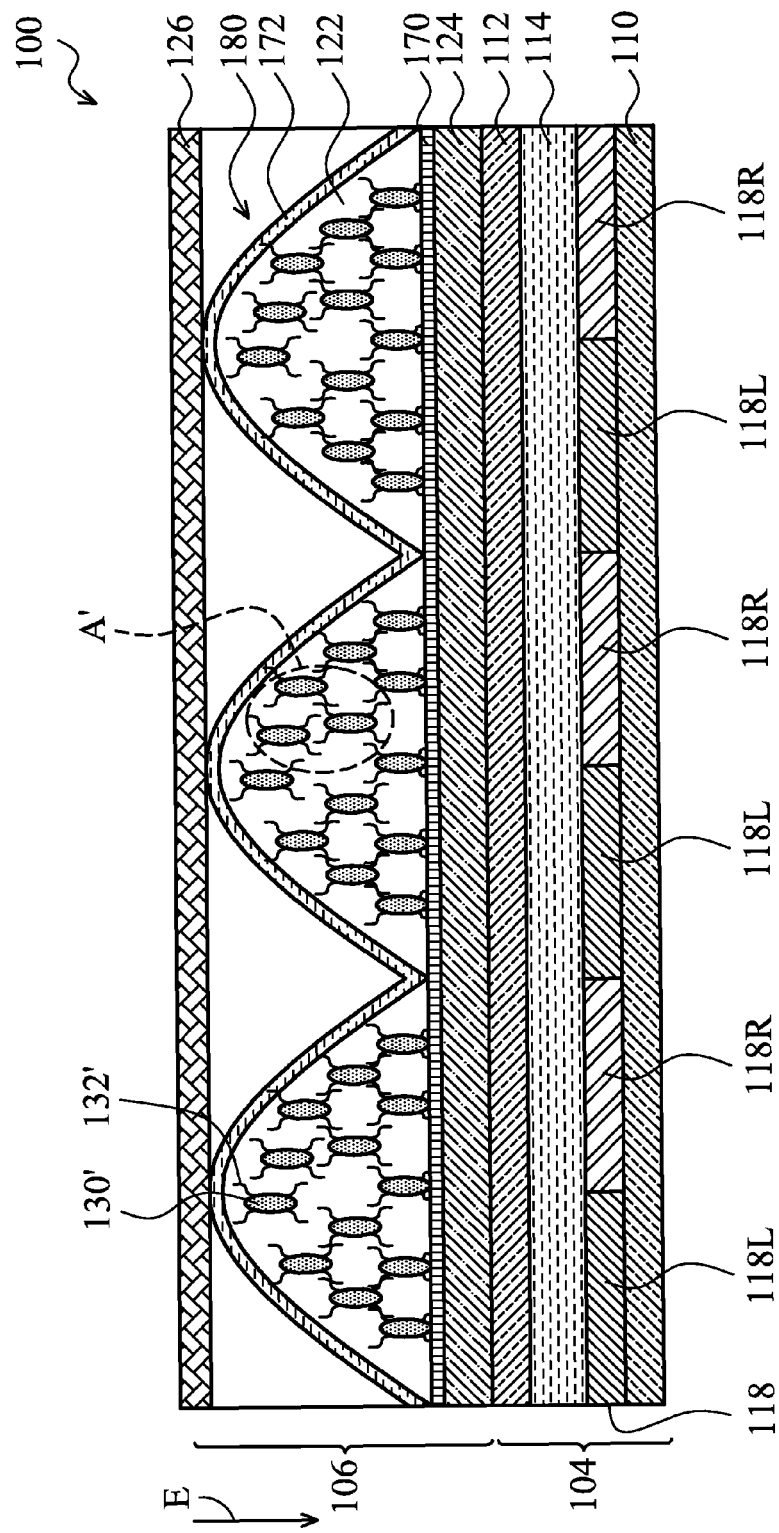
FIG. 1B shows an exemplary scheme of a second imaging mode of a 2D/3D switchable imaging apparatus according to an embodiment of the present disclosure.

FIG. 1B shows an exemplary scheme of the second imaging mode of the 2D/3D switchable imaging apparatus 100 according to an embodiment of the present disclosure. The 2D/3D switchable imaging apparatus 100 may switch to the 3D imaging mode when an electric field is formed between the first and the second electrodes 124 and 126. When in the second imaging mode, the first electrode 124 and the second electrode 126 may have different electric potentials so as an electric field E is formed therebetween and applied to the liquid-crystal monomers 130'. For example, the partial positive and the partial negative charges on the surface of liquid-crystal monomers 130', produced by the charge-controlling agent 132', may move toward the first electrode 124 and the second electrode 126 due to the guidance of the electric field E. Thus, a force helping rotate the liquid-crystal monomers 130' is generated while reducing the viscosity between the liquid-crystal monomers 130'. Accordingly, when the 2D/3D switchable imaging apparatus 100 according to the present disclosure is switched to the second imaging mode, the rotation rate of the liquid-crystal monomers 130' may be increased and a lower electric field is needed to drive these liquid-crystal monomers 130'. In the second imaging mode, the liquid-crystal monomers 130' may function as a lenticular lens to refract the light emitted from the left-eye pixels 118L and the right-eye pixels 118R. Accordingly, the light emitted from the left-eye pixels 118L and the right-eye pixels 118R of the imaging unit 118 may be refracted to the user's left eye and right eye, respectively, such that the 3D imaging is viewed.

Figure 2B:
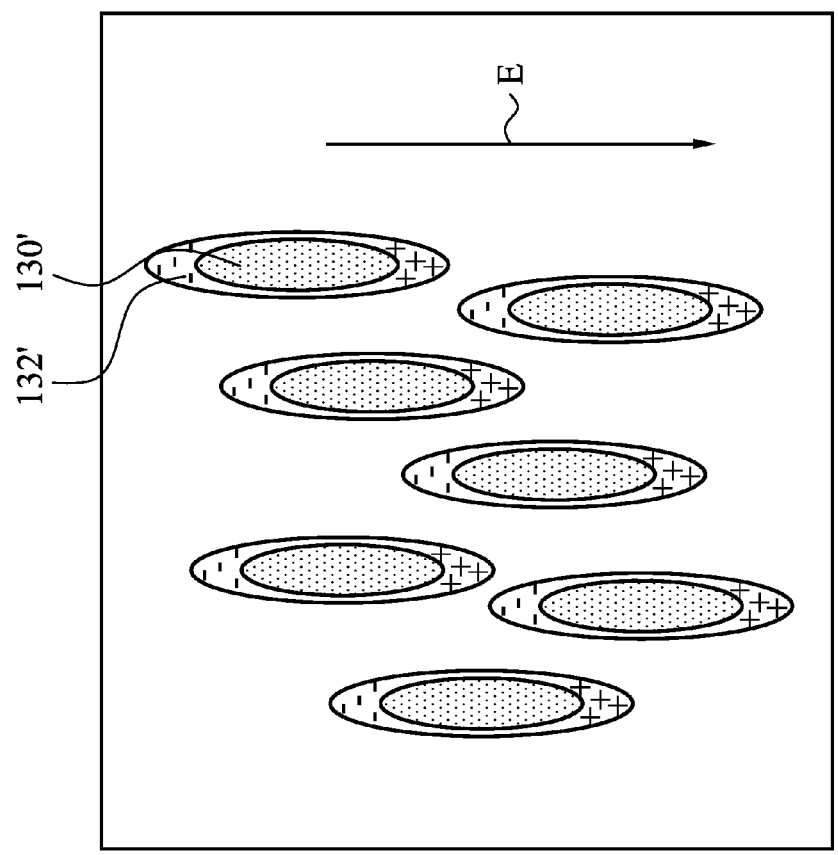
FIG. 2B shows an enlarged exemplary scheme of the area A' shown in FIG. 1B.

For example, FIG. 2B shows an exemplary scheme of an enlarged view of Area A' shown in FIG. 1B. When in the second imaging mode, the long axis of the liquid-crystal monomers 132' may rotate to parallel to the electric filed E due to the guidance of the electric field E. In addition, the partial positive and the partial negative charges on the surface of the liquid-crystal monomers 130', produced by the charge-controlling agent 132', may move toward the first electrode 124 and the second electrode 126, respectively (i.e. move along a direction parallel to the electric field). The force driving the partial positive and the partial negative charges moving toward the first electrode 124 and the second electrode 126 may increase the rotation rate of the liquid-crystal monomers 130' with a reduction of the applied voltage, when the 2D/3D switchable imaging apparatus 100 is switched to the second imaging mode. Similarly, the partial positive and the partial negative charges may also help increase the returning rate of the liquid-crystal monomers 130', when the switchable imaging apparatus 100 is switched to the first imaging mode.

In summary, since the surface of the liquid-crystal monomers may be partially polarized to produce partial positive and partial negative charges, the stability of the liquid-crystal monomers and the influence on the liquid-crystal monomers with respect to the electric field may be enhanced. For example, the influence may comprise reducing the magnitude of the electric field to drive the liquid-crystal monomers switching between the first imaging mode and the second imaging mode and increasing a response rate of the liquid-crystal monomers with respect to the electric field.

While the preferred embodiments of the invention have been described above, it will be recognized and understood that various modifications can be made to the invention and the appended claims are intended to cover all such modifications which may fall within the spirit and scope of the invention.

What is claimed is:

1. A 2D/3D switchable imaging apparatus, comprising:
   an imaging unit comprising an alternate arrangement of a plurality of left-eye pixels and a plurality of right-eye pixels; and
   an electronic light modulator disposed on the imaging unit, comprising;
   a lens structural layer, having a plurality of lenticular lens structures, interposed between a first electrode layer and a second electrode layer, wherein Each of the lens structures comprises a plurality of liquid-crystal monomers filled therein, the liquid-crystal monomers having a first imaging mode and a second imaging mode which are switched by an electric field; and
   a charge-controlling agent disposed on a surface of the liquid-crystal monomers such that an influence on the liquid-crystal monomers with respect to the electric field is enhanced.

2. The 2D/3D switchable imaging apparatus according to claim 1, wherein the influence comprises reducing a magnitude of the electric field to drive the liquid-crystal monomers into switching between the first imaging mode and the second imaging mode.

3. The 2D/3D switchable imaging apparatus according to claim 1, wherein the influence comprises increasing a response rate of the liquid-crystal monomers to the electric field.

4. The 2D/3D switchable imaging apparatus according to claim 1, wherein the liquid-crystal monomers are switched to the first imaging mode before the electrical field is applied to the liquid-crystal monomers.

5. The 2D/3D switchable imaging apparatus according to claim 4, wherein light emitted from the left-eye pixels and the right-eye pixels pass through the liquid-crystal monomers when the liquid-crystal monomers are switched to the first mode, such that the light is viewed by each eye of the user.

6. The 2D/3D switchable imaging apparatus according to claim 4, wherein partial positive and partial negative charges on the liquid-crystal monomers are arranged along an axis parallel to the first electrode and the second electrode when the liquid-crystal monomers are switched to the first imaging mode.

7. The 2D/3D switchable imaging apparatus according to claim 1, wherein the liquid-crystal monomers are switched to the second imaging mode when the electric field is applied to the liquid-crystal monomers.

8. The 2D/3D switchable imaging apparatus according to claim 7, wherein light emitted from the left-eye pixels and the right-eye pixels are refracted by the liquid-crystal monomers when the liquid-crystal monomers are switched to the second imaging mode, such that the light emitted from the left-eye pixels and the right-eye pixels are viewed by the left eye and the right eye of the user, respectively.

9. The 2D/3D switchable imaging apparatus according to claim 7, wherein partial positive and partial negative charges on the liquid-crystal monomers are arranged to parallel to the electric field when the liquid-crystal monomers are switched to the second imaging mode.

10. The 2D/3D switchable imaging apparatus according to claim 7, wherein the liquid-crystal monomers having a viscosity when the liquid-crystal monomers are switched to the second imaging mode, and the viscosity is lower than that of liquid-crystal monomers having no charge-controlling agent thereon.

11. The 2D/3D switchable imaging apparatus according to claim 1, wherein the charge-controlling agent comprises a positive charge-controlling agent selected from the group of quaternary ammonium salts, pyridine salts, onium salts, metal salts, nigrosine dye, polyamine resin, triphenylmethane, imidazole derivatives, amine derivatives, and phosphonium salts.

12. The 2D/3D switchable imaging apparatus according to claim 1, wherein the charge-controlling agent comprises a negative charge-controlling agent selected from the group of metal complexes of salicylic acid, alkyl-salicylic acid, azo dye, calixarene compounds, benzyl acid boron complexes, sulfonate salts, and fluorocarbon derivatives.

13. The 2D/3D switchable imaging apparatus according to claim 1, wherein the charge-controlling agent comprises ionic surfactant selected from the group of aerosol-OT, sodium dodecylbenzenesulfonate, metal salts, polybutene succinimide, maleic anhydride copolymers, vinylpyridine copolymers, maleic anhydride copolymers, acrylic acid copolymers and N,N-dimethylaminoethyl acrylate copolymers.

14. The 2D/3D switchable imaging apparatus according to claim 1, wherein the charge-controlling agent is physically adsorbed on the surface of the liquid-crystal monomers.

15. The 2D/3D switchable imaging apparatus according to claim 1, wherein the liquid-crystal monomers in each lenticular lens structure are totally electroneutral.

16. The 2D/3D switchable imaging apparatus according to claim 1, wherein the electronic light modulator further comprises a first alignment layer interposed between the first electrode and the lens structure layer, and a second alignment layer conformally coated on the lens structural layer.

17. The 2D/3D switchable imaging apparatus according to claim 16, wherein the first alignment layer and the second alignment layer align the liquid-crystal monomers such that a long axis of liquid-crystal monomers is arranged along a horizontal direction, when the liquid-crystal monomers are switched to the first imaging mode.

18. The 2D/3D switchable imaging apparatus according to claim 1, wherein the electronic light modulator further comprises a spacing layer filled in the interspaces between the lens structural layer and the second electrode layer.

19. The 2D/3D switchable imaging apparatus according to claim 1, wherein a positive charge-controlling agent and a negative charge-controlling agent are concurrently adsorbed on the surface of the liquid-crystal monomers.

20. The 2D/3D switchable imaging apparatus according to claim 1, wherein the imaging unit comprises a liquid-crystal display apparatus, a light-emitting diode imaging apparatus, an organic light-emitting diode imaging apparatus, or combinations thereof.

* * * * *